United States Patent [19]
Fleshman

[11] 3,964,439
[45] June 22, 1976

[54] NON-CLIMBABLE POULTRY CAGE FRONT
[76] Inventor: Roger L. Fleshman, 10360 W. 74th Place, Arvada, Colo. 80005
[22] Filed: Nov. 27, 1974
[21] Appl. No.: 527,708

Related U.S. Application Data
[63] Continuation-in-part of Ser. No. 513,992, Oct. 11, 1974, abandoned.

[52] U.S. Cl. .............................................. 119/17
[51] Int. Cl.² ........................................ A01K 31/06
[58] Field of Search .............................. 119/17–19, 119/21, 22, 48

[56] References Cited
UNITED STATES PATENTS
1,733,382   10/1929   McCurdy ............................ 119/17
1,961,682   6/1934    Brower ............................... 119/18
1,973,530   9/1934    Hart .................................. 119/17

Primary Examiner—Louis G. Mancene
Assistant Examiner—J. N. Eskovitz
Attorney, Agent, or Firm—James E. Pittenger

[57] ABSTRACT

A cage front for use in poultry cages for the rearing of fowl from their first day to market age having a plurality of bifurcated bars mounted in vertical, adjacent positions to form the cage front. The bars are equally spaced horizontally and are aligned to form a symmetrical pattern of openings. Each bar has a straight stem section with a pair of downwardly extending legs which have a sinuous or curved configuration. This configuration forms a plurality of alternating vertical openings and constrictions between the legs and bars, with the widest vertical openings in the area of the upper stem sections. In an alternate configuration, the width of the legs are increased toward their ends so that the openings are tapered and decrease in width towards the floor of the cage. The series of vertical openings thus allow poultry of various sizes or species to extend their head through the cage front without restricting the raising of the head during the feeding and watering process. In addition, no horizontal surfaces are provided which would allow the poultry to climb the cage front to escape from the larger upper openings.

13 Claims, 6 Drawing Figures

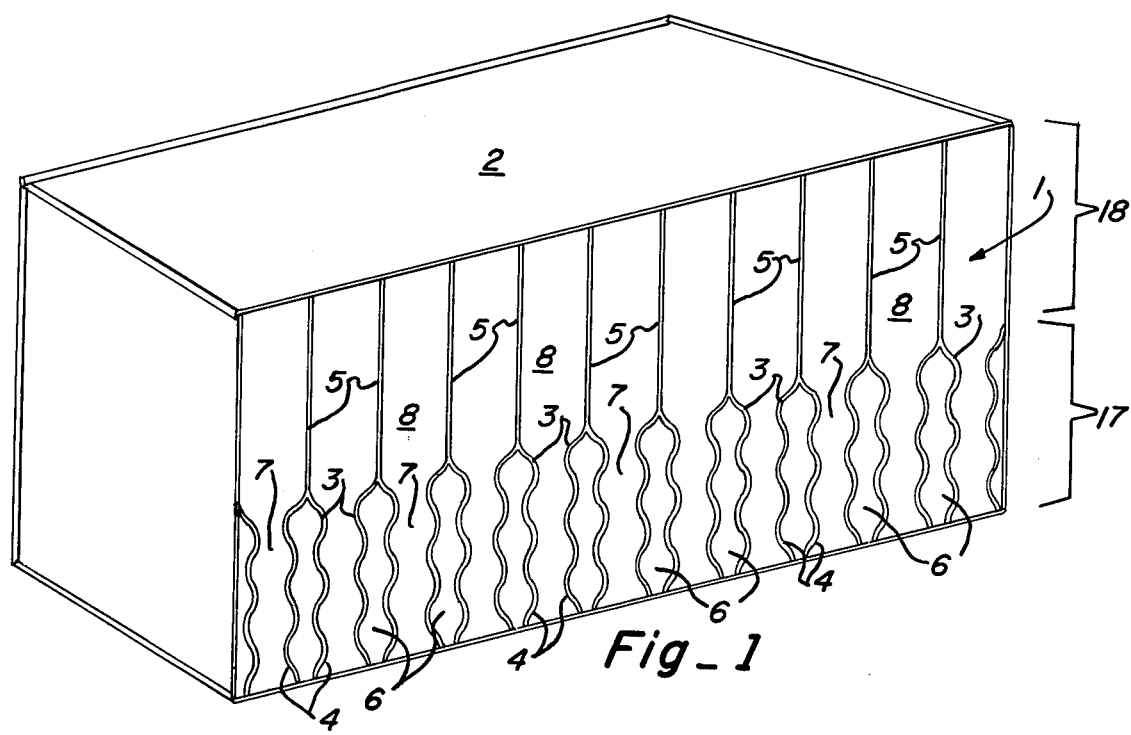
Fig_1
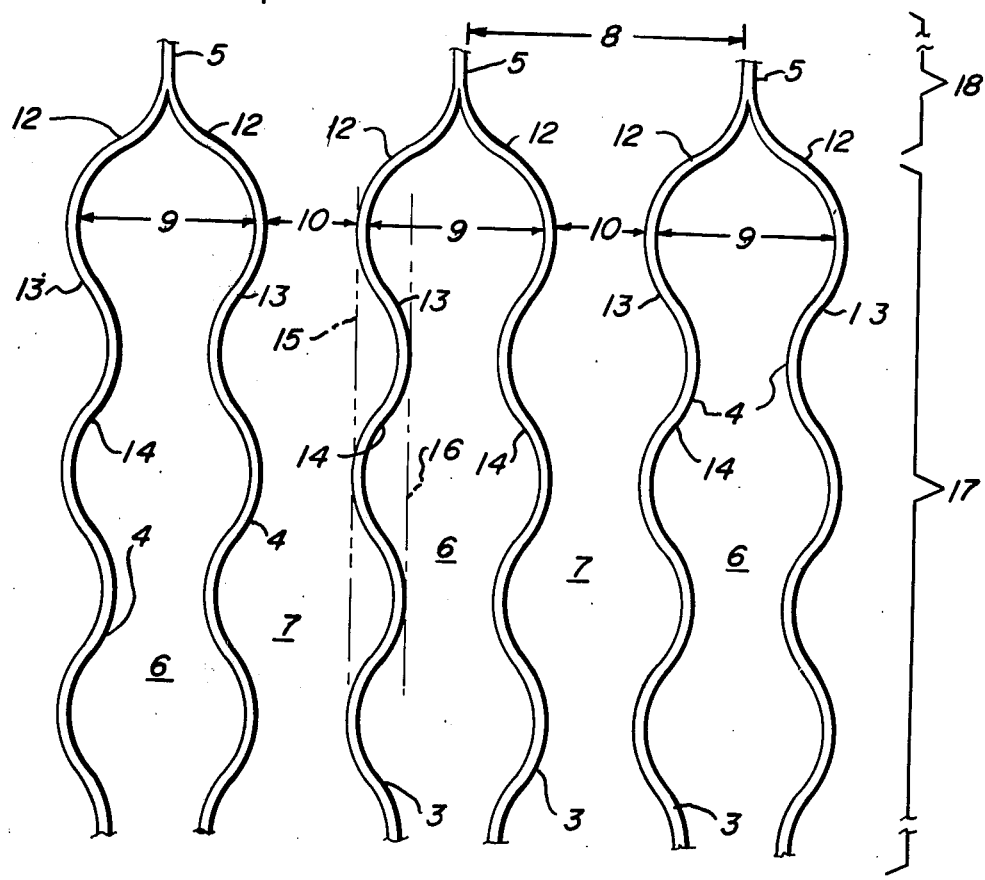
Fig_2

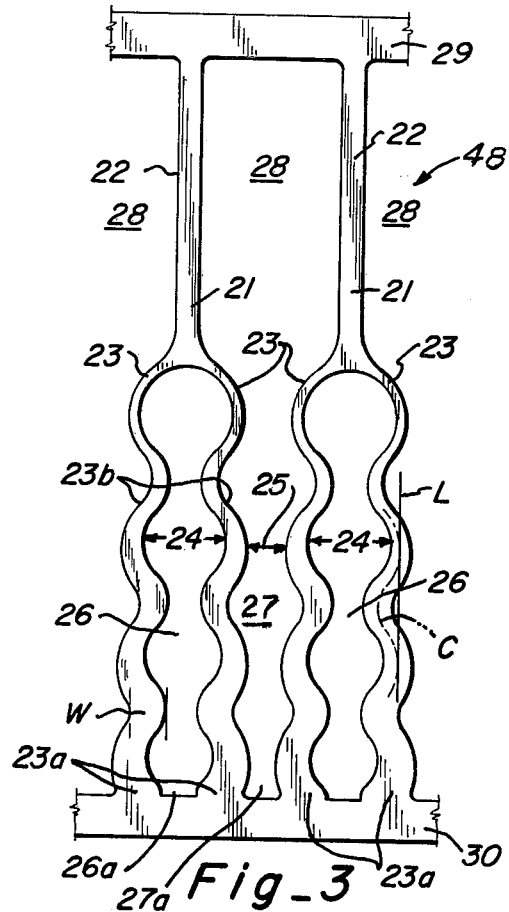
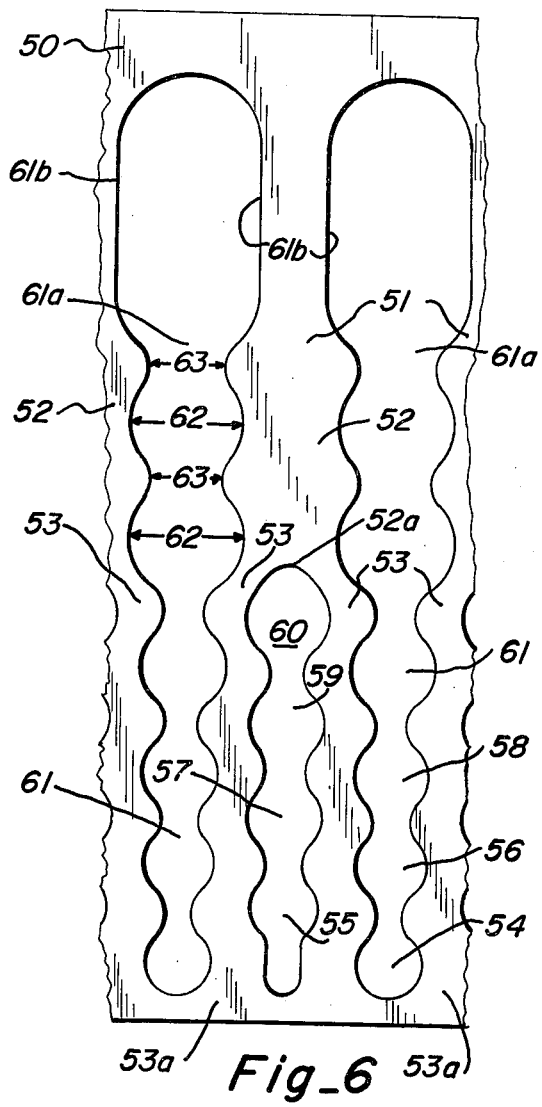
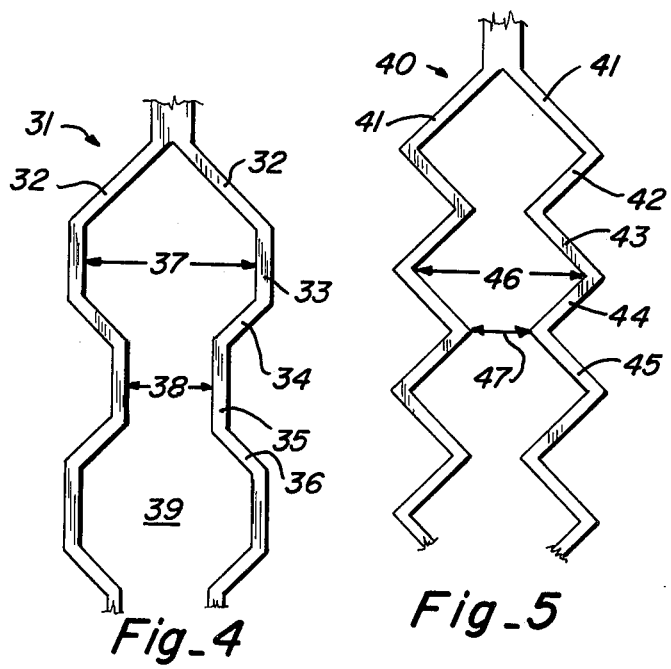
Fig_3  Fig_4  Fig_5  Fig_6

NON-CLIMBABLE POULTRY CAGE FRONT

This is a continuation-in-part application of my application, Ser. No. 513,992, filed Oct. 11, 1974, now abandoned.

This invention is directed to a novel non-climbable poultry rearing cage front which can be used to efficiently raise poultry from day one to market age.

In the past, it has been well known to raise newly hatched poultry in brooders under which the fowl could seek out the most comfortable environment. These brooders were generally suspended above the floor and were lighted and heated at the center of the brooder. Free movement of the fowl under the brooder was allowed and the fowl could move from the heated center out to feed and water located under or near the outer edge of the brooder. It has been found that brooders require more labor, space, and management than cages designed for rearing newly hatched poultry. Also, malfunctions sometimes caused fowl to pile up until there was considerable loss from death by suffocation.

Poultry have been raised by starting newly hatched fowl in cages which were designed to accommodate day-old fowl. Some cages were similar to brooders in that heat and light were available inside the cage. Other cages were placed in buildings in which the entire building was heated to a desired temperature. Some cages and cage fronts were designed to accommodate the fowl for a portion of the time required for rearing and the fowl had to be moved to or from other cages for portions of the rearing time. It has been found that this moving of the fowl from one cage to another requires more labor, extra handling of fowl, and further accommodations to complete rearing to market age.

In the prior art, cages have been designed to confine poultry through the entire day-old to market age rearing period. The cage fronts of these cages had small openings in the lower portion of the front and larger openings in the upper portion. The day-old fowl could feed and/or water through the smaller openings without escaping the cage and maturing fowl could feed and/or water through the larger openings. Because of the climbing abilities of most young fowl, the larger openings had to be blocked while the fowl were small in order to keep the fowl confined to the cage. These openings were then unblocked when the fowl were large enough not to escape through these larger openings which were needed by the growing fowl to reach through the cage front to feed or water on the outside of the cage front. It has been found that these cage fronts require more labor, more material to block the larger openings, and often restricted the efficiency of the fowl to feed and water.

Because of the problems and inefficiencies stated above as being present in the prior art, it is an object of the present invention that the shape of each bar and the placement of the bars in the cage front provide openings which allow the fowl easy access to food and water outside the cage front. The fowl can easily reach through the wider parts of the lower portion of the vertical openings while constricted points of the lower portion restrain the fowl from escaping the cage.

Another object of the present invention is that the shape of each bar and the placement of the bars in the cage front provide openings which do not restrict the vertical movement of the head or neck of the fowl when reaching through the cage front. The neck of the fowl can easily pass through the constrictions, thus allowing free vertical movement. Because most fowl tend to raise their head and body when feeding or drinking, a cage front allowing unrestricted vertical movement is important for feeding efficiency.

A further object of the present invention is the placement of the bars in the cage front to provide multiple openings which are at a variety of heights above the cage floor. Since fowl of the same species and age are not all the same size, notably a difference in sizes of the sexes, it is important that each fowl regardless of size has easy access to food and water outside the cage front.

It is a still further object of the present invention to provide cage bars where the openings formed decrease in width closer to the cage floor to accommodate the smaller birds with the larger birds which naturally stand taller having a correspondingly wider opening.

A still further object of the present invention is the placement of the bars in the cage front to provide multiple openings which, from the floor upward, are devoid of horizontal surfaces upon which the fowl could get footing to climb out through the larger upper openings. Because fowl can climb well enough where horizontal footing is provided to require the blocking of larger upper openings in cage fronts, it is important financially to eliminate the labor and material required to block and unblock these upper openings.

The present invention is directed to a poultry cage front wherein cage front bars are curved in such a manner as to create, when placed in the cage front, vertical openings which have multiple constricted lower portions and enlarging in the upper portions of the cage front into wider unconstricted vertical openings. Each bar is made with a straight upper portion or stem section which is bifurcated or forks into two parts or legs where the upper and lower portions meet. These two parts of the fork are curved in such a manner as to create a multiple constricted vertical opening below the straight upper portion of the bar.

Each part of the fork curves outward and down from the junction of the two parts until the curve starts inward to form the first constriction of the vertical opening below the straight upper portion of the bar.

Each part of the fork curves outward and down from the junction of the two parts until the curve starts inward to form the first constriction of the vertical opening below the straight upper portion of the bar. The horizontal distance covered by the inward curve is approximately half that covered by the first outward curve. Each fork part then curves outward again as far as the first outward curve until the outside edges of the two curves are vertically aligned. The fork then curves inward the same distance as the first constriction. This outward-inward curving of the fork parts continues downward forming multiple constrictions of the vertical opening formed by the two fork parts.

The distance between the parts of the fork at the constriction of the vertical opening is approximately half the distance of the furthest separation of the two parts where the parts curving outward reach their outward zeniths.

The cage front bars are mounted vertical and parallel to each other in the cage front with the minimum distance between bars equal to the distance between the fork parts of a bar at a constriction. Placing of the bars creates the slots or vertical openings which have a lower multiple constricted portion and a wider unconstricted upper portion. The straight portion or stem of the bars form the upper portion of the vertical openings, and the maximum distance between the upper portion of the bars is approximately three times the distance at the point of constriction of the vertical opening plus or minus thickness of material used to make the bars.

The shorter vertical opening formed by the parts of the fork of a bar and the lower portion of the vertical opening formed by the adjacent placement of two bars are similar in conformity. The constriction of the shorter vertical opening makes the outward curved part of the taller opening. Vice versa, the constriction of the taller opening makes the outward curved part of the shorter vertical opening between the two parts of the fork of a bar.

In another embodiment, each of the legs of the bars can be arranged to uniformly or in stepped fashion increase in width in order to taper the vertical openings formed. Thus, due to the increased width as the legs approach their ends adjacent to the floor of the cage, the wide and constricted areas are reduced in size. In this way the smaller birds encounter a narrow opening closer to the floor, while larger birds which are correspondingly taller encounter a wider opening. An added feature is that since the tapered opening is wider at the upper portion the birds can more easily raise their heads and necks during the feeding and watering process which is a natural movement.

Throughout this specification, it is to be understood that the reference to the front of the cage merely refers to surface of the cage through which the birds normally extend their heads for feed and water. The bars of the present invention are installed to form this surface to accommodate and improve the servicing of these birds. It is also to be understood that the reference to the legs being curved or sinuous is not intended to be limited to a smoothly curved configuration but can be formed by a series of short straight sections forming an octagonal, diamond or other polyganol configuration to provide the wide areas and constrictions between the legs and bars.

Various materials, such as metal, synthetic resins, plastics or the like, may be used to construct the cage front bars. Principally, the materials shall be appropriate to the poultry being contained.

Other objects and features of this invention will appear in the following description and appended claims, reference being made to the accompanying drawings forming a part of the specification, wherein like reference characters designate corresponding parts or portions thereof in the different views.

FIG. 1 is a perspective view of a poultry cage having a cage front formed by a plurality of cage bars according to the present invention; and FIG. 2 is a front elevation view of a section of the cage front of FIG. 1.

FIG. 3 is a front elevation view of another embodiment of the cage front showing the legs having a uniform increase in width towards their lower ends;

FIG. 4 is a partial elevation view of a bar for the cage front with the legs forming a series of hexagonal shapes;

FIG. 5 is a partial elevation view of a bar for the cage front having a series of diamond shapes; and FIG. 6 is a front elevation view of another embodiment of a cage front with the front formed as a one-piece unit by removing or molding the material to form the vertical openings and bars.

Turning now more specifically to the drawings, FIG. 1 shows the cage front 1 attached to a cage 2 and the arrangement of the cage bars 3 in the cage front 1. Also shown in FIG. 1 is the lower constricted portion 17 and the unconstricted upper portion 18 of the cage front 1.

FIG. 2 is a closer look at a portion of a cage bar 3 and the relationship of several bars together. Shown are the sinuous or curved bifurcated or forked lower parts or legs 4 and the straight upper part or stem 5 of the bar 3. The relationship of the vertical opening 6, formed between the forked parts 4, and the vertical opening 7 formed by the arrangement of bars 3 is depicted. Also formed by the arrangement of bars 3 is the wider upper portion 8 of the vertical opening 7 which, in the upper portion 18, is without the constrictive configurations which are characteristic of the lower portion 17 of the bar arrangement.

The vertical openings 6 and 7 in the lower portion 17 of the bar arrangement allow the unrestricted vertical movement of the head, neck, and body of the fowl. Depicted in FIG. 2 is the multiple, varied in height, wide areas 9 in the lower portion 17 at which the younger or smaller fowl can reach through the cage front 1 with ease. In constrast are the multiple constrictions 10 of the lower portion 17 which contain the fowl within the cage 2.

Both FIG. 1 and FIG. 2 show the lack of horizontal surfaces from bottom to top which could be used by the fowl to climb the cage front 1 and escape through the wider upper portion 8.

Further, FIG. 2 shows the straight upper stem portion 5 of the cage bars 3, the forking of the cage bar 11, the first outward curve 12 of each fork part 4, the inward curves 13 and the remaining outward curves 14. The dotted line 15 indicates the vertical alignment of the outward curves 12 and 14 at a point where each starts to curve inward. The dotted line 16 indicates the vertical alignment of the inward curves 13 which form the constrictions 10. FIG. 2 shows the wide areas 9 and the constrictions 10 formed by the placement and shape of the cage bars 3.

In one embodiment, the approximate dimensions for placement of cage bars are as follows: width of wide areas 9 determined by specie of fowl confined; width of constrictions 10 equal to half the width of wide areas 9; width of wider upper portion 8 is three times the width of constrictions 10; height of lower portion 17 and upper portion 18 determined by species of fowl confined; and height of constrictions 10 proportional to wide areas 9 determined by curves inward 13 and outward curves 14 which are arcs of a circle having a radius equal to the width of constriction 10.

It has been found that the following dimensions for the cage front bars are satisfactory for the following species of fowl. These dimensions are given as examples only and are not intended to limit the invention to the species mentioned nor to the dimensions given.

| Fowl | Width of Wide Area(9) | Width of Constriction(10) | Height to Stem | Total Height(17 & 18) |
|---|---|---|---|---|
| Layer Chicks | 1" | 1/2" | 5 1/2" | 12" |
| Broiler Chicks | 1 3/16" | 19/32" | 6" | 12" |
| Turkey Poults | 1 3/16" | 19/32" | 6" | 14"(6 wks.) |

In order to provide the cage front 1 as a separate unit, the cage bars 3 can be attached at their top and bottom ends to a pair of parallel members 19, 20 to form a rigid unit which can be attached to the cage as a wall or door. To utilize the cage front as a door, either the upper member 20 or lower member 19 can be pivotally attached to one edge of the cage 2, with the opposite member secured or released from the cage to allow ingress or egress of poultry.

In another embodiment, as shown in FIG. 3, a cage front 48 is provided which further aids in retaining small or young poultry chicks of any species in the cage and still prevents escape by means of climbing. In this arrangement, similar to the device described previously, the individual bars 21 have a straight upper stem 22 with the stem separated into bifurcated legs 23 extending downwardly. The leg portions have a sinuous or curved configuration which produces an alternating series of wide 24 and constricted 25 areas therebetween which heretofore has been defined as a vertical opening or slot 26. Each individual leg is arranged so as to increase the width W of the leg from the stem 22 or a starting point spaced downwardly from the stem toward the end 23a of the leg 23. Thus, the downwardly width W of the leg 23 increased either uniformly as shown in FIG. 3 or can be arranged in steps, (not shown) with the width or thickness increasing equally on each side of the center line c of each leg. The arrangement of the bars in adjacent, horizontally equally spaced, complementing position, similar as shown in FIG. 1, again produces the vertical openings 27 between the legs of the bar and the outer sides of the bars to form the series of vertical openings 27 in the lower portions and the wider vertical openings 28 in the upper or stem portions.

The center line c of the leg portions of the bars can be arranged to correspond to the exact same center line as provided in the legs of the arrangement shown in FIG. 2. This is to say that the center line follows a continuous uniform curve with the base line L of the curve forming a vertical line. With the width W of the legs increasing toward their ends 23a, which would be adjacent to or near the floor of the cage, the width of the wide openings 24 and constrictions 25 uniformly decrease towards the lower end 23a. Thus, the vertical openings 26, 27, as can be seen in the drawing, taper with the narrow portion of the openings or slots at the bottom most ends 26a, 27a. In this embodiment, the wide openings and constrictions are smallest near the cage floor and will better contain the shorter and younger poultry. As the poultry grow taller and larger, their heads and necks will increase in size and correspond to the wider openings which are progressively elevated above the floor. This configuration also provides an increasingly wider opening above the head and neck of the poultry which provides greater clearance to allow the bird to raise its head which is common and natural in the drinking process, as well as in the feeding process. Any number of the bars can be positioned adjacent to each other to form a door or cage front having various lengths with the stem and leg portions of the bars attached to upper and lower cross members 29, 30 respectively. If it is desired to increase the height of the legs, the increase in the width of the legs can start at a point spaced downwardly from the stem 22, so that the necessary taper does not produce excessively wide openings in the upper portions.

Throughout the description of the present invention, it is to be understood that various configurations can be provided for the curved shape of the leg portions of the bars. This is to say that the legs, in order to form the sinuous or wavy configuration, do not have to be smoothly curved but can be formed from a series of short, straight or flat sections which are illustrated in FIGS. 4 and 5.

In FIG. 4 is seen an arrangement where short, straight sections 33–36 form the legs 32 and are arranged in the pattern of a series of hexagonals which provide the wide 37 and constricted 38 areas of the slotted vertical openings 39. In like token, as shown in FIG. 5, the legs 41 can be formed from a plurality of short lengths 42–45 which are arranged in a series of partial diamond shapes, again to form the wide 46 and constricted areas 47. Thus, a smooth curve is not required so long as the legs form the pattern of wide and constricted areas which allow the poultry to feed and water and yet prevent their escape from the cage by climbing over or passing through the opening in the cage front.

Another embodiment is shown in FIG. 6. In this embodiment, the bars are formed as a single, unitary, one piece front or door 50, with the entire unit formed by molding or the openings may be cut from flat sheet material having sufficient thickness to provide the necessary rigidity. A member representing a bar 51, as described previously, is provided with a stem 52 and bifurcated downwardly extending legs 53. Again, the width of the legs can be uniformly increased or stepped as the legs approach their ends 53a or the cage floor. Thus, the openings 54, 55 are narrower than 56, 57 and, in turn, these openings 56, 57 are narrower than openings 58, 59. The slots or vertical openings 60, 61 have the same general taper and are essentially identical in the lower portions. In the upper portion, above the junction 52a of the legs 53, the vertical slots 61 can take on a slightly different configuration. The wide openings 62 and constrictions 63 are shown each having the same dimension with the remainder of the upper slots 61a being wider and having parallel sides 61b.

The lower portion of the cage front according to this invention is the most critical with equal spacing between the legs and bars necessary to make the front compatible for all ages and sizes of poultry. The upper portion of the bars can then have openings of a constant width, thus permitting the stems and openings to be as tall as desired without affecting the width of the openings in the lower portion.

It is to be understood that the necessary lack of horizontal surfaces stated herein applies to the lower portion of the cage front where the young poultry can possibly reach the surface in order to climb to the higher, wider openings to escape. Horizontal surfaces, such as reinforcing cross bars, can be utilized in the upper portions of the cage front to tie the bars or stems together to form a more rigid unit, if desired. The necessity for cross bar reinforcing is primarily determined by the materials used in construction.

While a poultry rearing cage front and the bars for said front have been shown and described in detail, it is obvious that this invention is not to be considered to be limited to the exact form disclosed and that changes in detail and construction may be made therein within the scope of the invention without departing from the spirit thereof.

Having thus set forth and disclosed the nature of this invention, what is claimed is:

1. A cage front for a poultry cage comprising:
   a. a plurality of parallel, spaced cage bars mounted vertically along a side of a poultry cage;
   b. each of said bars includes an upper straight stem section and a lower bifurcated section having a pair of generally parallel legs, each of said legs being formed in a back and forth, sinuous configuration, with the curves of each leg arranged to complement the other whereby an alternating series of wide and constricted openings are formed between said legs and
   c. said bars are horizontally aligned so that similar wide and constricted openings are formed between the sides of the legs of said bars and wider slotted openings are formed between the stem sections of said bars;
   d. the openings between said legs and bars allow poultry of any size to freely feed and water through the front without providing horizontal surfaces which would allow smaller poultry to climb the bars and escape through the wider upper openings.

2. A cage front as defined in claim 1 wherein:
said bars are spaced so that the width of the openings between legs of adjacent bars is equal to the width of the openings between the legs of the individual bars.

3. A cage front as defined in claim 1 wherein:
the width of the constricted openings between said legs is one half of the width of the wide openings between said legs.

4. A cage front as defined in claim 1, wherein:
the configuration of the complementing leg portions which form the wide and constricted areas is substantially circular.

5. A cage front as defined in claim 1, wherein:
said bars are joined at each end to a pair of parallel members, one of said members being pivotally attached to an edge of said cage so that the cage front can be pivotally opened to permit ingress and egress of poultry into the cage.

6. A cage front as defined in claim 1, wherein:
the configuration of the complementing leg portions which form the wide and constricted areas is formed from a series of short straight sections arranged to form partial polygonal shapes.

7. A cage front as defined in claim 6, wherein:
the legs of the bars are formed in a partial diamond configuration.

8. A cage front as defined in claim 6 wherein
the legs are formed in a partial hexagonal configuration.

9. A cage front as defined in claim 1, wherein:
the legs of the cage bars are arranged to increase in thickness towards their lower ends whereby the width of the wide and constricted areas formed between the legs and between the bars decrease in width towards the lower ends.

10. A poultry cage front as defined in claim 9 wherein:
the increase in width of the legs of said bars is uniform throughout and the horizontal space in between said bars is equal to the spacing between said legs.

11. A poultry cage front as defined in claim 9 wherein the legs forming the lower portion of the bar sections are uniformly tapered to increase the width towards the ends of the legs and the upper portions of the bars in the vicinity of the stems have an alternating series of wide and constricted area with a vertical opening extending upwardly thereabove.

12. A poultry cage front as defined in claim 1 wherein:
the width of the legs is increased towards their ends starting from a point spaced from the junction of the stem and legs of said bars.

13. A poultry cage front as defined in claim 1 wherein:
the front is formed from a one-piece, generally flat member with the openings made therein to form said bars.

* * * * *